United States Patent Office 2,923,750
Patented Feb. 2, 1960

2,923,750

FERRIC PYROPHOSPHATE HYDRATE-BF$_3$-MoCl$_5$ CATALYST AND ALKYLATION PROCESS

Joe T. Kelly, Dickinson, and Harmon M. Knight, La Marque, Tex., assignors to The American Oil Company, Texas City, Tex., a corporation of Texas No Drawing. Application October 27, 1958
Serial No. 769,570

4 Claims. (Cl. 260—683.44)

This invention relates to a catalyst adapted for conversions of hydrocarbons and processes utilizing the catalyst.

In U.S. 2,824,146, there is set out a process for alkylation of hydrocarbons using as the catalyst a system consisting essentially of ferric pyrophosphate hydrate-BF$_3$ complex and BF$_3$. This process requires circulation of BF$_3$ in the system and recovery of BF$_3$ from the product stream. It is obvious that economic advantages exist for a catalyst which does not require the BF$_3$ circulation.

An object of the invention is a catalyst of the ferric pyrophosphate-BF$_3$ type, which does not require additional BF$_3$. A further object is a solid catalyst containing ferric pyrophosphate hydrate and BF$_3$. Other objects will become apparent in the course of the detailed description of the invention.

It has been discovered that an effective catalyst for many hydrocarbon reactions, particularly alkylation and polymerization, is obtained by intermingling ferric pyrophosphate hydrate-BF$_3$ complex, as hereinafter defined, and molybdenum pentachloride, in a hereinafter defined ratio.

The catalyst composition consists essentially of two solid members. One member is a complex having the empirical formula Fe$_4$(P$_2$O$_7$)$_3$.$a$H$_2$O.$b$BF$_3$ where "$a$" is at least 3 and "$b$" is from about 0.7$a$ to "$a$." Ferric pyrophosphate forms hydrates with water, which hydrates may contain from 1 to as many as 18 moles of water of hydration per mole of ferric pyrophosphate. It has been found that the catalytically effective complex should contain at least 3 moles of water of hydration per mole of ferric pyrophosphate. In general, it is preferred that the complex be formed from ferric pyrophosphate hydrate containing from 6 to 9 moles of water of hydration per mole of ferric pyrophosphate. Boron trifluoride must be present in the complex; apparently the BF$_3$ complexes with the hydrated water to form a solid material. In order to attain effective catalytic activity, it is necessary that the complex contain at least 0.7 mole of BF$_3$ per mole of hydrate water, and preferably the complex should contain 1 mole of BF$_3$ for each mole of water of hydration present. To illustrate, when ferric pyrophosphate .6H$_2$O is the hydrate, the complex must contain at least 4 moles of BF$_3$ and preferably contains 6 moles of BF$_3$; these two complexes may be written as Fe$_4$(P$_2$O$_7$)$_3$.6H$_2$O.4BF$_3$ and Fe$_4$(P$_2$O$_7$)$_3$.6H$_2$O.6BF$_3$.

The BF$_3$ and the hydrate are reacted to form a solid material containing complexed BF$_3$. When the salt hydrate and BF$_3$ are contacted in a closed vessel, the BF$_3$ partial pressure drops very rapidly at first and then gradually approaches a constant value. It appears that a very rapid reaction between the BF$_3$ and some of the water of hydration takes place. This initially rapid reaction is then followed by a relatively slow reaction between the remaining molecules of hydrate water and additional BF$_3$. In the case of ferric pyrophosphate containing 11 moles of hydrate water per mole of the salt, it appears that 4 or 5 moles of hydrate water are rapidly reacted. However, stirring of finely powdered hydrate salt in the presence of excess BF$_3$ at about room temperature for a period of about 20 hours, results in the reaction of 1 mole of BF$_3$ for each mole of hydrate water present in the ferric pyrophosphate hydrate.

The solid complex of ferric pyrophosphate hydrate and BF$_3$ has moderate catalytic activity and may be used for purposes such as polymerizing isobutylene. This complex has no activity for the difficult ethylene-isobutane alkylation reaction. It has been found that a catalyst system of great activity is obtained by intermingling the defined ferric pyrophosphate hydrate-BF$_3$ complex with molybdenum pentachloride in a mole ratio of MoCl$_5$ to ferric pyrophosphate from about 0.5 to about 3 and preferably from about 1.5 to 2. The composition consisting essentially of the defined complex and MoCl$_5$ in this ratio is very effective for promoting the difficult ethylene-isobutane alkylation reaction. For less difficult reactions, a composition containing more or less MoCl$_5$ may be used.

The defined composition of complex and MoCl$_5$ may be used as such; the composition may be used in the form of a powder or shaped into pellets. Or, the catalyst composition may be supported on a carrier such as alumina, pumice, silica, silica alumina and carbon.

The catalyst may be used at any temperature below the temperature at which the salt hydrate decomposes, that is, loss of all its water of hydration. The temperatures of operation may be as low as −25° C. or even lower. Temperatures as high as 150° C. and even higher may be used with some of the hydrates which have relatively high decomposition temperatures. For example, ferric pyrophosphate .5H$_2$O has been heated for 20 hours at 168° C. without losing water of hydration. More usually the temperature of operation will be below about 30° C. Low temperatures favor the formation of the hydrocarbons having 6 to 7 carbon atoms and diisopropyl in ethylene-isobutane reaction. It is preferred to operate this alkylation process at a temperature between about +25° C. and +5° C.

Sufficient pressure is maintained on the system to keep a substantial portion of the hydrocarbons charged in the liquid state. In general, pressures will be between about 50 and 1000 p.s.i. and preferably between about 100 and 600 p.s.i. for alkylation or polymerization.

The reactants in the hydrocarbon charge to the alkylation process are isoparaffin, or an aromatic hydrocarbon and olefin. The olefin contains from 2 to about 12 carbon atoms. Examples of suitable olefins are ethylene, propylene, butene-2, hexene and octene; in addition to these, the olefin polymers obtained from propylene and/or butylene are also suitable for use in the process, such as codimer, propylene trimer, propylene tetramer and butylene trimer. It is preferred to operate with ethylene or propylene.

The aromatic hydrocarbons must be alkylatable by the particular olefin used. It is self-evident that an aromatic hydrocarbon which contains alkyl substituents positioned so that steric hindrance would prevent or greatly reduce the possibility of alkylation with the particular olefin should not be subjected to the process. Examples of particularly suitable aromatic hydrocarbons are benzene, toluene, xylene, trimethylbenzenes, and the other alkyl analogues, such as propyl and butyl, the naphthalene aromatic hydrocarbons, such as the mono and disubstituted methylnaphthalenes.

The isoparaffin reactant is defined as a paraffinic hydrocarbon which has a tertiary hydrogen atom, i.e., paraffins which have a hydrocarbon atom attached to a tertiary carbon atom. Examples of these are isobutane, isopentane (2-methylbutane), 2-methylpentane, 2-methylhexane, 3-methylhexane, 2,3-dimethylbutane (di-isopropyl)

and 2,4-dimethylhexane. Thus the isoparaffins usable as one reactant in the process contain from 4 to 8 carbon atoms.

In the isoparaffin-olefin system, the alkylation reaction is more favored as the mole ratio of isoparaffin to olefin increases. In general, the isoparaffin to olefin mole ratio in the hydrocarbon charge should be at least 1. More than this amount is good and it is desirable to have an isoparaffin to olefin ratio between about 2 and 25 and in some cases more, for example, as much as 50. It is preferred to operate with an isoparaffin to olefin mole ratio of between about 5 and 15.

The presence of non-reactive hydrocarbons in the hydrocarbon charge is not detrimental unless the reactants become excessively diluted. For example, the isoparaffin may also contain isomers of the normal configuration. The olefins may contain paraffins of the same carbon number. Mixtures of 2 or more isoparaffins or 2 or more aromatic hydrocarbons, or 2 or more olefins may be charged. In general, when a particular product distribution is desired, it is preferable to operate with a single isoparaffin and a single olefin, for example, technical grade isobutane and ethylene, i.e., about 95% purity.

The reactants may be mixed together before they are charged into the reactor. Or, they may be charged into the reactor separately. Or, a portion of the olefin may be blended with the isoparaffin or aromatic before introduction into the reactor and the remainder of the olefin injected into the reactor. The charge may be introduced all at one point into the reactor or it may be introduced at 2 or more points. The alkylation reaction is somewhat exothermic and temperature control is facilitated by introducing the olefin into the reactor at more than one point.

The contacting of the isoparaffin or aromatic hydrocarbon and the olefin in the presence of the defined catalyst pair is continued until an appreciable amount of alkylate has been formed. In batch reactions, it is possible to virtually extinguish the olefin, i.e., convert substantially 100% of the olefin by a sufficiently long period of contacting. When operating in a continuous flow system, it may be desirable to have a time of contacting such that substantial amounts of olefin are not converted and obtain the complete conversion of the olefin by a recycle operation. The time of reaction will be determined by the type of hydrocarbons charged, the ratio of isoparaffin or aromatic to olefin, the degree of mixing in the contacting zone and the catalyst usage. A few tests will enable one to determine the optimum time of contacting for the particular system of operating conditions being tried.

The hydrocarbon reaction may be carried out in a reactor which may be a vessel providing for a batch-type reaction, i.e., one wherein the desired amount of isoparaffin or aromatic and olefin are charged to a closed vessel containing the catalyst pair and the vessel then maintained at the desired temperature for the desired time. At the end of this time, the hydrocarbon product mixture and unreacted materials are withdrawn from the vessel and processed to separate the alkylate product from the unreacted materials and lower and higher molecular weight materials. The reaction may be carried out in a fixed bed operation wherein the reactants are flowed through a bed of catalyst, the space velocity being controlled so that the desired amount of reaction is obtained during the passage of the reactants through the bed. Under some conditions, a moving bed of catalyst may be utilized. In still another set of circumstances, a fluidized bed may be utilized with the incoming stream of reactants providing the energy for the fluidization of the catalyst. Other methods of operation common in the catalytic refining aspects of the petroleum industry utilizing solid catalyst may be readily devised.

Tests

For purposes of illustration, the results of comparable tests using a catalyst composition of the invention and the complex alone are set out below.

The tests were made as follows: 90 g. of $$Fe_4(P_2O_7)_3.9H_2O$$

and 200 ml. of isobutane were charged to a dry 4-liter carbon steel bomb. The bomb was then placed in an ice bath and cooled. $BF_3$ was slowly added with care to avoid overheating of the salt as a result of the exothermic reaction. The bomb was gradually pressured to 250–300 p.s.i.g. with $BF_3$ and allowed to stand at least 12 hours, after which the bomb was repressured and evacuated. The $MoCl_5$ was added, when used, and then 1000 g. of a blend of isobutane and ethylene were charged (3/1 molar I/O). The bomb was rocked 20 hours at 20°–30° C. and then sampled for Podbielniak distillation analysis.

Test 1: Only 18 weight percent of alkylate were obtained when only ferric pyrophosphate hydrate—$BF_3$ complex was present as catalyst in the reactor.

Test 2: In this test where the catalyst composition consisted of ferric pyrophosphate $.9H_2O.9BF_3$ and molybdenum pentachloride in a mole ratio of 0.6 mole of $MoCl_5$ per mole of ferric pyrophosphate, the alkylate yield of material boiling above pentane was 113 weight percent based on ethylene charged.

Test 3: This test was carried out as in Test 2, except that the mole ratio of $MoCl_5$ to pyrophosphate was 1.7. In this test, the $C_{5+}$ yield was 167 weight percent based on ethylene charged.

Thus having described the invention, what is claimed is:

1. A composition consisting essentially of (1) a complex having the empirical formula $Fe_4(P_2O_7)_3.aH_2O.bBF_3$ where "$a$" is at least 3 and "$b$" is from about $0.7a$ to "$a$" and (2) molybdenum pentachloride, where the molar ratio of said chloride to said pyrophosphate is from about 0.5 to about 3.

2. A composition consisting essentially of (1) the complex $Fe_4(P_2O_7)_3.9H_2O.9BF_3$ and (2) $MoCl_5$ where the mole ratio of said chloride to said pyrophosphate is from about 1.5 to 2.

3. An alkylation process comprising contacting an alkylatable hydrocarbon with an olefin, at a temperature below the temperature of decomposition of ferric pyrophosphate hydrate and at a pressure sufficient to maintain a substantial portion of said reactants in the liquid state, in the presence of a catalyst consisting essentially of (1) a complex having the empirical formula $$Fe_4(P_2O_7)_3.aH_2O.bBF_3$$

where "$a$" is at least 3 and "$b$" is from about $0.7a$ to "$a$" and (2) molybdenum pentachloride, where the molar ratio of said chloride to said pyrophosphate is from about 0.5 to about 3.

4. The process of claim 3 wherein said catalyst is a composition consisting essentially of (1) the complex $Fe_4(P_2O_7)_3.9H_2O.9BF_3$ and (2) $MoCl_5$ where the mole ratio of said chloride to said pyrophosphate is from about 1.5 to 2.

References Cited in the file of this patent

UNITED STATES PATENTS 2,406,869    Upham _____ Sept. 3, 1946
2,824,146    Kelly et al. _____ Feb. 18, 1958